(12) United States Patent
Sadler et al.

(10) Patent No.: US 8,005,728 B2
(45) Date of Patent: Aug. 23, 2011

(54) CURRENCY ORDERING BY DENOMINATION

(75) Inventors: Robert B. Sadler, Charlotte, NC (US); Adam S. Byerley, Charlotte, NC (US); Jesse Lorinsky, Charlotte, NC (US)

(73) Assignee: Bank of America, Charlotte, NC (US)

( * ) Notice: Subject to any disclaimer, the term of this patent is extended or adjusted under 35 U.S.C. 154(b) by 177 days.

(21) Appl. No.: 12/176,481

(22) Filed: Jul. 21, 2008

(65) Prior Publication Data

US 2010/0017310 A1    Jan. 21, 2010

(51) Int. Cl.
*G06Q 10/00* (2006.01)
(52) U.S. Cl. .............................. 705/28; 705/26; 705/43
(58) Field of Classification Search ................... 705/26, 705/28, 43
See application file for complete search history.

(56) References Cited

U.S. PATENT DOCUMENTS

| 5,799,288 | A  | * | 8/1998 | Tanaka et al. | 705/43 |
| 7,340,415 | B1 | * | 3/2008 | Gasper et al. | 705/26 |
| 2004/0030622 | A1 | * | 2/2004 | Ramos et al. | 705/35 |
| 2004/0158539 | A1 | * | 8/2004 | Akita et al. | 705/400 |
| 2004/0182675 | A1 | * | 9/2004 | Long et al. | 194/206 |
| 2009/0138383 | A1 |   | 5/2009 | Alba et al. | |

OTHER PUBLICATIONS

ACI Worldwide and Diebold Bring Online Solutions to Merchant Banking Customers, Nov. 28, 2000, PR Newswire.*
Emrick, Anthony J, EFT Network connections help bring the bank to the customer, Jan. 1997, Hoosier Banker, vol. 81, No. 1, pp. 11-12.*
Lee, Calvin B., Multi-Echelon Inventory Optimization, Evant White Paper Series, 2003, pp. 1-14, Evant Inc.
Durbin, E.P., Wollmer, R.D., Recent Work in Multi-Echelon Inventory Theory, Jul. 1, 1966, The RAND Corporation, Santa Monica, CA.
Collaborative Planning, Forecasting and Replenishment (CPFR): A Tutorial, pp. 1-8. Supply Chain Resource Cooperative, 2006, North Carolina State University.
Barret, Jane, Window of Opportunity: Manufacturers Look to Supply Chain Visibility to Improve Customer Service, Oct. 5, 2007, http://web.archive.org/web/20071011054933/amrresearch.com/Content/View.asp?pmillid=20794, AMR Research.
Silver, Edward A., Peterson, Rein, Decision Systems for Inventory Management and Production Planning, 1979, John Wiley & Sons,Inc., NY, New York. Chapter 12, pp. 463-471.
Silver, Edward A., Peterson, Rein, Decision Systems for Inventory Management and Production Planning, 1979, John Wiley & Sons,Inc., NY, New York. Chapter 12, pp. 488-490.
Silver, Edward A., Peterson, Rein, Decision Systems for Inventory Management and Production Planning, 1979, John Wiley & Sons, Inc., NY, New York, pp. 256-260.
Tsiakis, P., Shah, N., Pantelides, C., Design of Multi-echelon Supply Chain Networks under Demand Uncertainty, Industrial & Engineering Chemical Research, 2001, American Chemical Society Publications, pp. 3585-3604. Amini, M., Retzlaff-Roberts, D., Bienstock, C., Designing a Reverse Logistics Operation for Short Cycle Time Repair Services, International Journal of Production Economics, 2005, vol. 96, Issue 3, Elsevier, B. V., pp. 367-380.
Teunter, Rudd H., Economic Ordering Quantities for Recoverable Item Inventory Systems, 1999, Naval Research Logistics, vol. 48 (2001), pp. 484-495, John Wiley & Sons, Inc.
Culbertson, S., Harris, I., Radosevich, S., Synchronization-Hewlett Packard Style, Supply Chain Management Review, Mar. 1, 2005, Reed Elsevier Inc.

* cited by examiner

*Primary Examiner* — Matthew S Gart
*Assistant Examiner* — Talia Crawley
(74) *Attorney, Agent, or Firm* — Weiss & Arons, LLP

(57) ABSTRACT

Apparatus and methods for calculating a currency shipment amount for a banking center. The currency shipment amount may correspond to currency having a uniform denomination. The apparatus and methods may involve formulating a historical mix fraction for the uniform denomination; calculating a future order period desired starting balance based on the historical mix fraction; and calculating the currency shipment amount based on the future order period desired starting balance and a banking center ending balance.

7 Claims, 4 Drawing Sheets

CURRENCY ORDERING BY DENOMINATION

FIELD OF TECHNOLOGY

Aspects of the disclosure relate to managing an inventory of stocked items. In particular, the disclosure relates to managing different denominations of legal tender (bills and coins) in a retail banking business.

BACKGROUND

Retail banking is one example of an industry that involves maintenance of an inventory that includes a mix of multiple products. In some industries, those products are referred to using stock keeping units (SKUs).

In retail banking, customer's are served at banking centers. A banking institution maintains an inventory of bills and coins that will meet the daily needs of the banking center's customers. Seven denominations of cash are commonly required by customers: 1, 2, 5, 10, 20, 50 and 100 dollars. A cash vault may be used to hold excess inventory for the banking center and for multiple other banking centers. Each banking center, therefore, may have a cash vault that is designated to serve that banking center. (A cash vault is often located in the same geographic area as the banking centers that it serves.) The banking center orders cash from the cash vault (which may be referred to as the "Servicing Cash Vault") according to a preset schedule. An order may require that cash be shipped from the banking center to the servicing cash vault (a "ship-out"). An order may require that cash be shipped from the servicing cash vault to the banking center (a "ship-in").

Cash is ordered at the beginning of a "lead time" that leads up to the "order period" (or "horizon period") during which the ordered cash is to be used. Enough cash must be ordered to maintain proper inventory during the order period. At the time an order is submitted—i.e., at the beginning of the lead time, the amount of cash present at the banking center is known. The amount of cash that will be present at the beginning of the order period, however, is not known. The amount of cash that will be present at the beginning of the order period must, therefore, be estimated. It is estimated based on the amount of cash present at the time the order is submitted. Assumptions must be made regarding increases and decreases of cash inventory during the lead time. Assumptions also must be made about how much cash will be required during the order period.

When an order is generated, a recommended net quantity (ship-in–ship-out) is systematically calculated based in part on the forecasted net usage for each day between order generation and subsequent scheduled delivery or pickup (the order "lead time") and in part on forecasted usage during the days between the next shipping and the subsequent shipping (the "order period" or "horizon period"). Typically, when orders are fulfilled, they are split arbitrarily into denominational quantities without specifying which denominations should be shipped-in and/or shipped-out.

Banking center associates often encounter uncertainty regarding how much currency to order for a future period of time. There are at least three general types of uncertainty: uncertain customer behavior, uncertain associate confidence in systematic results, or uncertain likelihood that process and procedure will be followed as designed. Holding extra currency at the banking center is a common approach to avoidance of errors that might result from the uncertainty. As a result, banking centers now hold more total currency than is needed.

Excessive cash inventory has an opportunity cost, because the cash cannot be utilized for other purposes.

When banking centers underestimate the need for cash and, consequently, cannot distribute the cash to customers in a manner that satisfies the customers' requirements, customer service is degraded and customer satisfaction is reduced. Despite the practice of holding extra inventory, banking centers often place expensive emergency orders for specific denominations.

Cash inventory management methods are therefore used. There are four known primary approaches to cash inventory management:

I. Method One

Initially, a recommended net quantity is arbitrarily split such that if the total net quantity is a ship-out, all denominations will be presented as ship-outs, or if the total net quantity is a ship-in, all denominations will be presented as ship-ins. It is typically assumed that these splits will not necessarily meet customer demand. In a subsequent step, a banking center associate estimates the denominational needs over the order lead time and horizon period, determines the current inventory level of each denomination, and then decomposes the recommended net quantity into an appropriate set of denominational ship-ins and ship-outs.

FIG. 1 shows Method One. Information is input and processed by three components: forecast/order management system 102, existing information systems 104 and TOS/On-site banking center personnel 106. (A "TOS" is a Teller Operations Specialist. A banking center may have a TOS that reviews, edits and approves cash orders.) At step 108, forecast/order management system 102 generates a recommended order quantity. At step 110, existing information systems 104 provide prior day inventory by denomination. At step 112, TOS/On-site banking center personnel provide local knowledge. At step 114, TOS/On-site banking center personnel combine prior day inventory by denomination (output from step 110) with local knowledge (output from step 112) to calculate an order with a denominational split. Recommended order quantity (from step 108) is included in the calculation of the order.

At step 116, TOS/On-site banking center personnel place orders for ship-in and/or ship-out quantities, each having a denominational split. At step 118, forecast/order management system 102 performs a transaction update based on the ship-in and ship-out quantities from step 116.

II. Method Two

Arbitrary denominational splits are eliminated and a banking center associate provides denomination-by-denomination input. The associate estimates needs, assesses current inventory, and breaks down a recommended net quantity into denominational requirements.

III. Method Three

Banking center requirements for denomination splits are forecast by cash vaults. Since there are seven primary currency denominations (1, 2, 5, 10, 20, 50, 100) this system involves at least seven times the computational overhead of methods that do not perform denominational forecasting. The extra computation overhead can be accommodated, because of the small ratio of vaults to banking centers in the banking network and because required denominational data, including historical data, are available at the vaults. This facilitates forecasting.

Denomination specific forecasts of future demand are used to generate separate ship-in or ship-out orders for each denomination using the same order calculation methodology used now for net quantity orders.

IV. Method Four

Banking centers usually do not have transactional data by denomination, but they do have denominational detail for end-of-day balances. This is in an interactive order process that uses those balances along with a predetermined total inventory desired mix. The banking center associate responsible for ordering cash must first declare the amounts of each denomination he would like to receive in the next order. Based on the declaration, the order calculation is completed and the associate is told what quantity of each denomination must be shipped-out. The order calculation is based on a target inventory level, which places a limit on inventory that the associate may maintain.

When making inventory management decisions, holding additional inventory is a common approach to deal with uncertainty. There are at least three general types of uncertainty: uncertain customer behavior, uncertain associate confidence in systematic results, or uncertain likelihood that process and procedure will be followed as designed. As a result, banking Centers now hold more total currency than is needed, but still have to place emergency orders (at higher than normal cost) for specific denominations.

It would be desirable, therefore, to provide apparatus and methods for increasing the accuracy of denominational cash ordering.

SUMMARY OF THE INVENTION

It is an object of this invention to provide apparatus and methods for increasing the accuracy of denominational cash ordering. Apparatus and methods for calculating a currency shipment amount for a banking center are provided. The currency shipment amount may correspond to currency having a uniform denomination. Currency shipment amounts for several different corresponding denominations may be calculated.

The apparatus and methods may involve using historical currency usage information for individual denominations to determine the relative usage amounts ("mix fractions") of the denominations. The usage information may include, for each denomination on each day, end-of-day balances, ship-in amounts and ship-out amounts.

The mix fractions are then used to calculate for each denomination a starting amount for a future order period. The starting amount will depend on projected usage for the order period based on the assumption that the historical mix fraction is predictive of future usage. A currency shipment amount may then be calculated. The currency shipment amount may be calculated such that, for each denomination, usage during the lead time is accounted for.

The apparatus and methods may involve a storage module, an analysis engine; and an order output module. The analysis engine may be configured to receive from the storage module banking center end-of-day balances, ship-out amounts and ship-in amounts. The end-of-day balances, ship-out amounts and ship-in amounts may correspond to days in the initialization period. The analysis engine may be further configured to transmit to the order output module a currency shipment amount based on the ending balances, ship-out amounts and ship-in amounts.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF EMBODIMENTS

Figure 1:
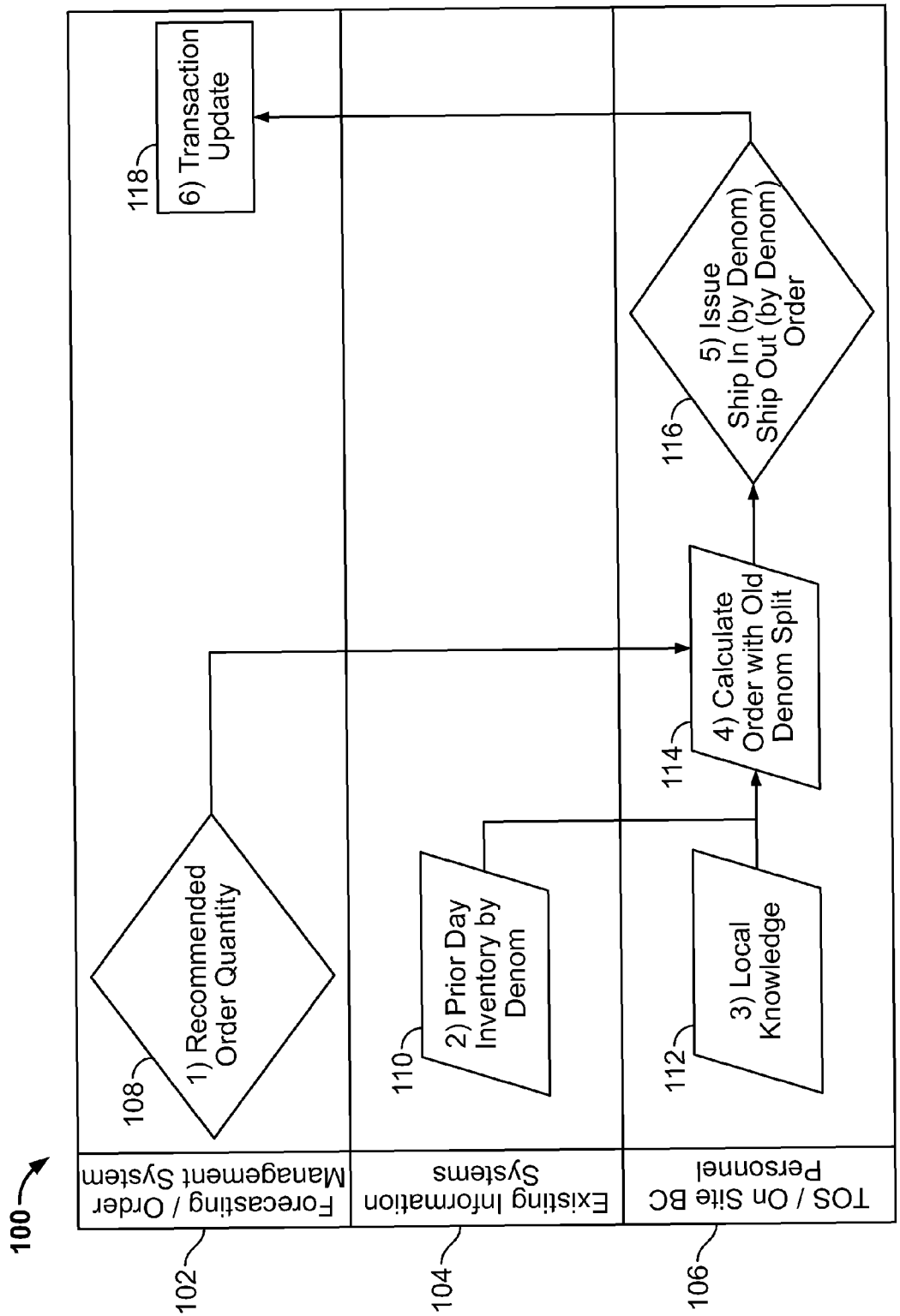
FIG. 1 shows a prior art process.

Apparatus and methods for calculating a currency shipment amount for a banking center are provided. The currency shipment amount may be a dollar-value that corresponds to bills of a single denomination. Currency shipment amounts for each denomination may be calculated. The apparatus and methods may involve using historical currency usage data to formulate a historical mix fraction for the single denomination. The mix fraction may be a measure or an index of the portion of a sum of money that is attributable to bills of the single denomination. The apparatus and methods may involve calculating a future-order-period desired starting balance for the banking center that is based on the historical mix fraction. The apparatus and methods may further involve calculating the currency shipment amount based on (a) the future-order-period desired starting balance; and (b) a banking center ending balance for a day In some embodiments, the need for a banking center associate to estimate denominational requirements, to assess current inventory level by denomination, or to decompose a total net recommendation into denomination specific ship-ins and ship-outs may be reduced or eliminated. Apparatus and methods in accordance with the principles of the invention may specify order quantities and denominations with sufficient accuracy to meet customer demand systematically, or from a central location. In some embodiments, order quantities and denominations may be specified with sufficient accuracy to meet customer demand without engaging an individual or resource with specific local knowledge.

In some embodiments, costs of providing cash to banking centers may be reduced. For example, the labor associated with cash ordering may be reduced or eliminated. Because the denomination split for each order may be based on customer need, the uncertainly associated with overly simplistic denominational splits will no longer bias total net recommended order quantities. Reduced uncertainty may help reduce total inventory levels. Because there may be fewer steps in which associates can override cash orders, uncertainty regarding process non-compliance may be reduced. Also, more accurate orders may reduce the frequency of emergency cash deliveries. Reduced emergency deliveries may reduce transportation costs and obtain a Green/Reduced-Carbon Footprint. Excess cost, banking center associate feedback and diagnostic reporting indicate that that systematic generation of suitable denomination-specific ship-ins and ship-outs would be beneficial.

In some embodiments, denominational currency shipment amounts may be computed as a mix fraction instead of using independent forecasting for each denomination. This may provide computational efficiency. This efficiency can contribute to cost saving in at least two ways. First, there may be reduced (or no) need for additional hardware, software and support such as would be required if forecasting were performed within the regular time windows used by existing methods. Second, uncertainties that increase with large lead times can be reduced or avoided. Uncertainties can be further reduced by using larger time windows for explicit forecasting calculations that are associated with longer lead times. The costs of the accompanying uncertainties also can be limited by using the longer windows instead of using additional processing capacity.

Figure 2:
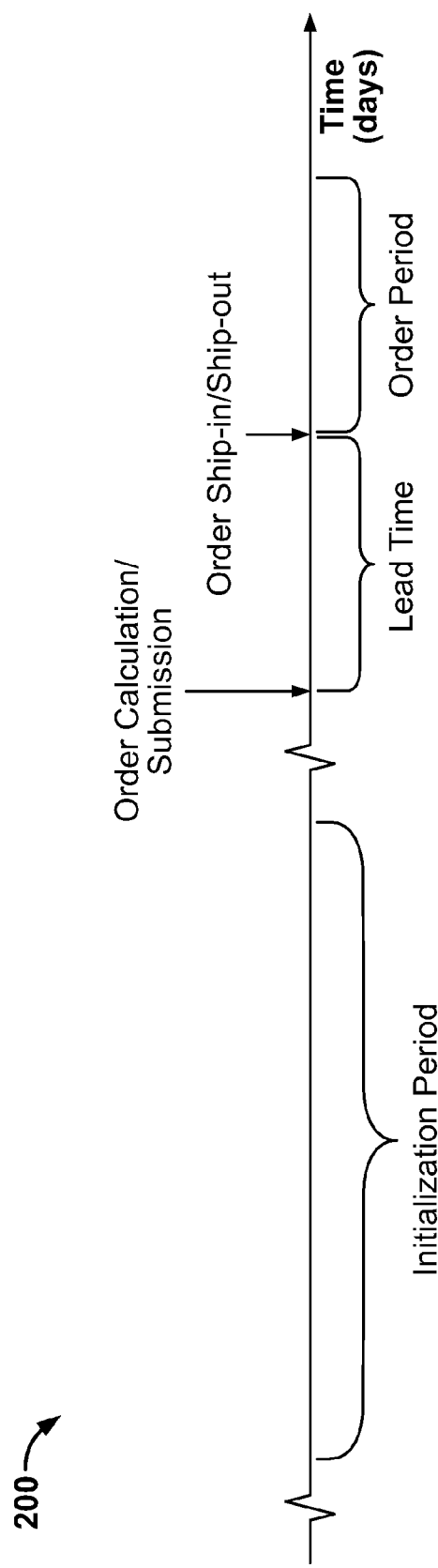
FIG. 2 shows an illustrative timeline that may be be followed in accordance with the principles of the invention.

FIG. 2 shows illustrative timeline 200 that may be involved in some embodiments of the invention. Timeline 200 shows an initialization period during which data may be accumulated for quantifying currency usage and mix fraction. Timeline 200 shows lead time between order calculation/submission and order ship-in/ship-out. For each denomination of currency, the number or value of bills or coins that will be present at the banking center immediately prior to ship-in/ship-out is estimated. Based on that estimation, an appropriate amount of each denomination of bill or coin can be shipped-in or shipped-out to leave the banking center with an appropriate amount of each denomination of bill or coin for the order period.

Banking centers exchange currency with customers on a daily basis. A banking center may be left without sufficient currency if it has a net outflow of cash for a series of consecutive days. "Maximum cumulative net usage" (MCNU) is the term that is used to quantify the net amount of currency that the banking center should be prepared to distribute during the series of consecutive days. In the context of currency ordering, MCNU between the day of order calculation and the final day of an order period is relevant for ordering accuracy. Based on MCNU recommended net order quantities may be calculated such that end-of-day balances based on forecast daily cash needs will not drop below a predetermined entity-minimum parameter.

In some embodiments, denominational ship-in (SID) and ship-out (SOD) quantities may be calculated as follows.

Daily denominational net usage may be calculated using existing end-of-day denomination balances. This is based in part on the knowledge that today's ending balance is the sum of ending balance from yesterday and net use from today. (It is noted that daily net use equals total daily cash given out to customers minus total daily cash taken in from customers).

MCNU may be calculated, by denomination, for each order period based on the daily net usage by denomination. The largest value of MCNU for each denomination over multiple order periods will be collected and the values will be summed. (For the primary bill denominations, there will be seven values to sum.) The fraction of each MNCU over this sum will be the target fraction for each denomination for the total cash inventory mix as each order (ship-ins delivered and ship-outs removed from inventory) is completed.

Equations 1-6, below, illustrate a method in accordance with the principles of the invention.

Equation 1 gives the net usage (outflow), NU, of bills at a banking center for each denomination, D, on each day, i, in an initialization period.

$$NU_{Di} = EB_{Di-1} - EB_{Di} - SI_{Di} + SO_{Di} \qquad \text{Eqn. 1}$$

In Equation 1:
$EB_{Di}$=Ending Balance for denomination D on day i;
$SI_{Di}$=Scheduled ship-in of denomination D on day i; and
$SO_{Di}$=Scheduled ship-out of denomination D on day i.

The starting day and ending day of the initialization period may be selected. Therefore, the historical period upon with the denomination mix fraction is based may be chosen to match expected future conditions in which the mix fraction will be applied.

Equation 2 identifies for a selected denomination the maximum cumulative outlay (Maximum Cumulative Net Usage, or "$MCNU_D$") by the banking center during all possible intervals of consecutive days in a selected order period.

$$MCNU_d = \max\left(\sum_{j=k}^{l}(NU_j)\right) \forall\, k, j \qquad \text{Eqn. 2}$$

In Equation 2:
$k \geq 1$,
$1 \leq m$; and
m=days in order period.

$MCNU_D$ is calculated for each order period in a historical initialization period. The initialization period may be any period for which $NU_j$ data are available. In some embodiments, the initialization period may be selected to be five weeks to insure that the initialization period includes a first-week-of-the-month, in which consumer currency usage is usually high. The number of weeks in an initialization period may be denoted by x in the following equations.

Equation 3 evaluates mix fraction FD for each denomination. FD is based on the largest $MCNU_D$ over all order periods of the initialization period. "$MMCNU_D$" is the notation used for the largest such $MCNU_D$. It is noted that the largest $MCNU_D$ for 10-dollar bills, e.g., may occur in an order period that is different from the order period corresponding to the largest $MCNU_D$ for 100-dollar bills. Therefore, FD may depend on $MCNU_D$s from different order periods.

$$F_{\hat{D}x} = \frac{MMCNU_{\hat{D}x}}{\sum_{D=1}^{100}(MMCNU_{Dx})} \qquad \text{Eqn. 3}$$

In Equation 3;
$\hat{D}$ is the denomination for which the mix fraction is calculated. $F_{\hat{D}x}$ will be calculated for each denomination for which a mix fraction is to be estimated.

Denominational ship-in and ship-out quantities for a future order are then calculated as follows.

Net Recommended Order Quantity (ROQ) is calculated as shown in Equation 4.

$$ROQ = Ent\text{Min} - (EB_{i-1} - MCNU) \qquad \text{Eqn. 4}$$

In Equation 4:
EntMin=the entity minimum for a selected banking center. The entity minimum is an amount selected to ensure that a banking center retains enough currency to service customers even if currency usage at a particular moment of a day exceeds forecasted NU for the day;
$EB_{i-1}$=the banking center ending balance on the day prior to the first day of the future order lead time; and MCNU for the future order lead time and future order period is forecast (based on forecasts for cash in (CI) and cash out (CO)) using known methods. (Features of one known method are set forth in "User Guide," Ver. 3., May, 2005, Carreker Corporation, Dallas, Tex., which is hereby incorporated herein in its entirety, for software that is known as Integrated Cash Operations Modules and sold by Carreker Corporation under the trademark ICOM.)

The desired starting balance ("$SB_D$") for the future order period may then be calculated using Equation 5. $SB_D$ for the future order period is the balance, for each denomination, that is desired to be present at the banking center on the first day of the order period after ship-in and ship-out are completed.

$$SB_D = (EB_{i-1} + ROQ) \times F_D \qquad \text{Eqn. 5}$$

In Equation 5:
$EB_{i-1}$ is the banking center ending balance on the day prior to the first day of the future order lead time;
ROQ is determined using Equation 4; and
FD is determined using Equation 3.

Denominational ship-in ($SI_D$) and ship-out ($SO_D$) quantities may then be calculated using Equations 6.

$$\begin{cases} SB_D - EB_{D,i-1} \geq 0 & SI_D = SB_D - EB_{D,i-1} \\ SB_D - EB_{D,i-1} < 0 & SO_D = EB_{D,i-1} - SB_D \end{cases} \qquad \text{Eqn. 6}$$

In Equation 6:

$SB_D$ is determined using Equation 5; and $EB_{D,i-1}$ is the banking center ending balance, for denomination D, on the day prior to the first day of the future order lead time.

It will be appreciated that the foregoing approach may be applied to the formulation of SKU level recommendations for a variety of commercial settings, in which multiple products are maintained in inventory. The apparatus and methods in accordance with the principles of the invention may be applied in those commercial settings. In some of those settings, the apparatus and methods may be applied with reduced requirements for explicit forecasting, which may be expensive.

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 3:
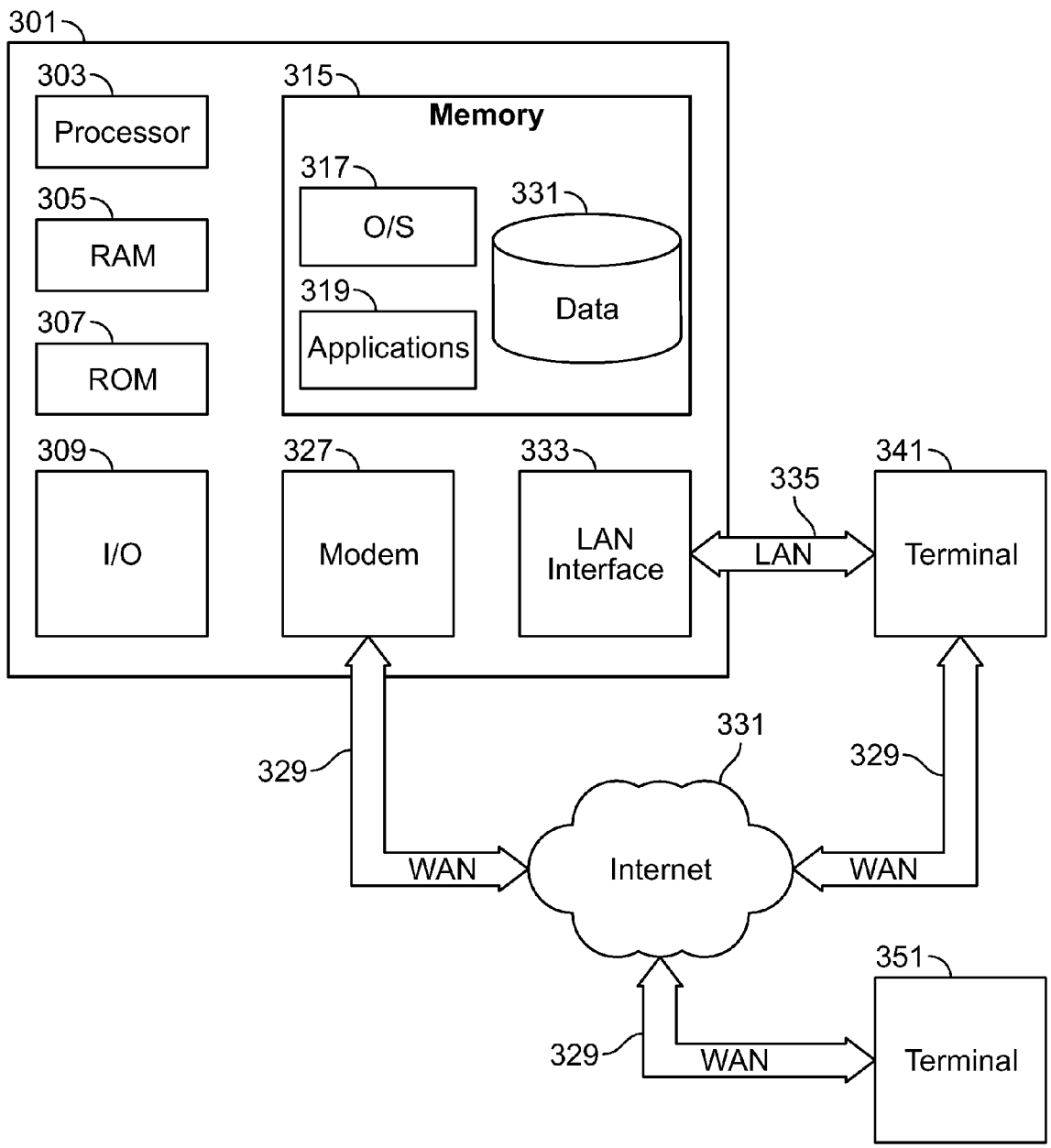
FIG. 3 illustrates a schematic diagram of a general-purpose digital computing environment in which one or more aspects of the present invention may be implemented.

FIG. 3 illustrates a block diagram of a generic computing device 301 (alternatively referred to herein as a "server") that may be used according to an illustrative embodiment of the invention. The computer server 301 may have a processor 303 for controlling overall operation of the server and its associated components, including RAM 305, ROM 307, input/output module 309, and memory 325.

Input/output ("I/O") module 309 may include a microphone, keypad, touch screen, and/or stylus through which a user of device 301 may provide input, and may also include one or more of a speaker for providing audio output and a video display device for providing textual, audiovisual and/or graphical output. Software may be stored within memory 325 and/or storage to provide instructions to processor 303 for enabling server 301 to perform various functions. For example, memory 325 may store software used by server 301, such as an operating system 317, application programs 319, and an associated database 321. Alternatively, some or all of server 301 computer executable instructions may be embodied in hardware or firmware (not shown). As described in detail below, database 321 may provide storage for denominational usage information, order archival information and any other suitable information.

Server 301 may operate in a networked environment supporting connections to one or more remote computers, such as terminals 341 and 351. Terminals 341 and 351 may be personal computers or servers that include many or all of the elements described above relative to server 301. The network connections depicted in FIG. 1 include a local area network (LAN) 325 and a wide area network (WAN) 329, but may also include other networks. When used in a LAN networking environment, computer 301 is connected to LAN 325 through a network interface or adapter 323. When used in a WAN networking environment, server 301 may include a modem 327 or other means for establishing communications over WAN 329, such as Internet 331. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 319, which may be used by server 301, may include computer executable instructions for invoking user functionality related to communication, such as email, short message service (SMS), and voice input and speech recognition applications.

Computing device 301 and/or terminals 341 or 351 may also be mobile terminals including various other components, such as a battery, speaker, and antennas (not shown).

A financial institution may use a terminal such as 341 or 351 to provide or obtain currency usage data, execute currency management processes and/or place orders for currency. Customer attribute information, including credit application information, may be stored in memory 325. The attribute information may be processed by an application such as one of applications 319.

One or more of applications 319 may include an algorithm that may be used to determine a currency mix fraction, a desired starting balance and/or a currency shipment amount.

Figure 4:
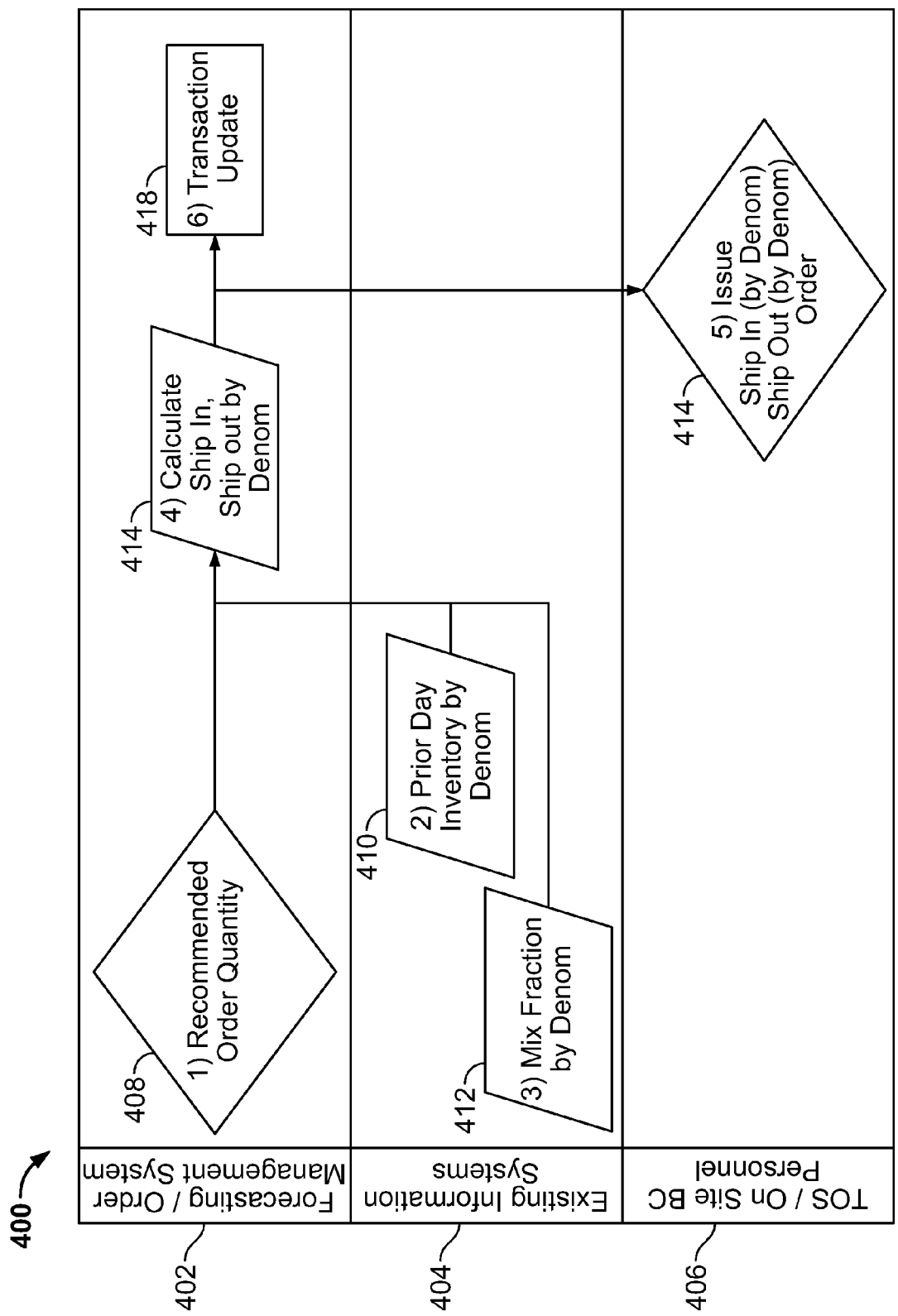
FIG. 4 shows a process in accordance with the principles of the invention.

FIG. 4 shows illustrative process 400 for denominational cash ordering. For the sake of illustration, process 400 will be described as being performed by a system. The system may include one or more of the devices shown in FIG. 3, one or more individuals and/or any other suitable device or approach.

In process 400, information may be input and processed by three system components: forecast/order management system 402, existing information systems 404 and TOS/On-site banking center personnel 406. At step 408, forecast/order management system 402 generates a recommended order quantity. The recommended order quantity may be generated using Equation 4 (above.) At step 410, existing information systems 304 provide prior day inventory by denomination. At step 412, existing information systems 304 provide a mix fraction by denomination. The mix fraction provided at step 412 may be based on the foregoing equations.

At step 414, forecast/order management system 402 may combine the results of steps 408, 410 and 412 into denominational ship-in/ship-out quantities. One or more of Equations 1-6 (above) may be used at step 414 to calculate the denominational ship-in/ship-out quantities. The ship-in/ship-out quantities may be provided to TOS/On-site banking center personnel 406, who may place orders for the ship-in/ship-out quantities at step 416. The ship-in/ship-out quantities may be used by forecast/order management system 402 to perform a transaction update at step 418.

It is noted that in some embodiments, calculation of denominational ship-in/ship-out quantities (step 414) is performed by forecast/order management system 402. In previously available systems, calculation of denominational ship-in/ship-out quantities may be performed by TOS/On-site banking center personnel. For example, see step 114 (shown in FIG. 1), which is performed by TOS/On-site banking center personnel 106.

It is noted also that in some embodiments, no human input may be needed to start or complete the generation of denomination specific ship-ins or ship-outs.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention is described herein in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Aspects of the invention are described herein in terms of illustrative embodiments thereof. A person having ordinary skill in the art will appreciate that numerous additional embodiments, modifications, and variations may exist that remain within the scope and spirit of the appended claims. For example, one of ordinary skill in the art will appreciate that the steps illustrated in the figures may be performed in other than the recited order and that one or more steps illustrated may be optional. The methods and systems of the above-referenced embodiments may also include other additional elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, apparatus and methods for calculating a currency shipment amount for a banking center have been provided. Persons skilled in the art will appreciate that the present invention can be practiced by other than the described embodiments, which are presented for purposes of illustration rather than of limitation, and that the present invention is limited only by the claims that follow.

What is claimed is:

1. A non-transitory computer-readable medium storing computer-executable instructions which, when executed by a processor on a computer system, performs a method for calculating a currency shipment amount for a banking center, the amount corresponding to currency having a uniform denomination that is one of several denominations, the method comprising:
    formulating a historical mix fraction for the uniform denomination; calculating a future order period desired starting balance of the uniform denomination for the banking center based on multiplying an aggregate value of two or more uniform denominations by the historical mix fraction for the uniform denomination; and
    calculating the currency shipment amount based on the future order period desired starting balance and a banking center ending balance corresponding to a day before a lead period of the order period, wherein, in the method, the formulating a historical mix fraction comprises: calculating for each denomination the maximum cumulative net usage (MCNU) that occurred during historical order periods in a selected initiation period;
    identifying for each denomination the largest MCNU (Maximum MCNU) that occurred during the historical order periods; and
    dividing each of the maximum MCNUs by the sum of the maximum MCNUs.

2. The medium of claim 1 wherein, in the method, the calculating a future order period desired starting balance comprises multiplying the historical mix fraction by an aggregate value of two or more uniform denominations corresponding to the sum of:
    (a) a banking center ending balance corresponding to a day before a lead period of the future order period; and
    (b) a forecasted net recommended order quantity.

3. The medium of claim 1 wherein the currency shipment amount is a ship-in amount.

4. The medium of claim 3 wherein the ship-in amount is the future order period desired starting balance minus a banking center ending balance corresponding to a day before a lead period of the future order period.

5. The medium of claim 1 wherein the currency shipment amount is a ship-out amount.

6. The medium of claim 5 wherein the ship-out amount is a banking center ending balance corresponding to a day before a lead period of the future order period minus the future order period desired starting balance.

7. An apparatus for calculating a currency shipment amount for a banking center, the amount corresponding to currency having a uniform denomination that is one of several denominations, the apparatus comprising: a storage module machine-readable memory; a processor in communication with the memory, the processor configured to function as an analysis engine in communication with the storage module; and
    a transmitter an order output module in communication with the analysis engine;
    wherein the analysis engine processor is configured to:
        receive from the storage module machine-readable memory banking center ending balances, ship-out amounts and ship-in amounts for days in a historic initialization period;
    formulate a historical mix fraction for the uniform denomination;
    calculate a future order period desired starting balance of the uniform denomination for the banking center based on multiplying an aggregate value of two or more uniform denominations by the historical mix fraction;
    calculate the currency shipment amount based on the future order period desired starting balance and a banking center ending balance corresponding to a day before a lead period of the order period; and
    initiate a transmission of transmit to the order output module the currency shipment amount, wherein, in the method, the formulating a historical mix fraction comprises:
    calculating for each denomination the maximum cumulative net usage (MCNU) that occurred during historical order periods in a selected initiation period;
    identifying for each denomination the largest MCNU (Maximum MCNU) that occurred during the historical order periods; and
    dividing each of the maximum MCNUs by the sum of the maximum MCNUs.

* * * * *